April 12, 1966 H. K. S. P. BEGEMANN 3,245,710
DEVICE AND METHOD FOR HANDLING SOLID BODIES
Filed Sept. 14, 1964

INVENTOR.
HEINRICH KARL SIMON PHILIP BEGEMANN
BY Spencer & Kaye
ATTORNEYS

United States Patent Office 3,245,710
Patented Apr. 12, 1966

3,245,710
DEVICE AND METHOD FOR HANDLING
SOLID BODIES
Heinrich Karl Simon Philip Begemann, The Hague,
Netherlands, assignor to Stichting Waterbouwkundig
Laboratorium, Delft, Netherlands, a corporation of the
Netherlands
Filed Sept. 14, 1964, Ser. No. 396,013
Claims priority, application Netherlands, Oct. 3, 1963,
298,800
6 Claims. (Cl. 294—86)

This invention relates to a device for handling solid bodies, a great many of these devices being known, which are provided with grapples exerting lateral forces on the bodies to be handled, which may give rise to vertical components with which the body can be removed from its site. However, in many cases the body is damaged by those forces prior to being lifted.

It is the object of the invention to provide a handling device, which does not show this drawback and which completely adjusts itself to the shape of the solid body.

For this purpose the handling device according to this invention comprises a sack mainly formed by a membrane and filled with a fluid, part of which is connected to a central lifting element, the outer edge being connected to a second lifting element which is relatively movable with respect to the first central lifting element.

With the aid of this device the handling of solid bodies is, according to the invention, effected as follows.

The sack filled with fluid, which is carried by the two lifting elements is positioned over a body which is to be handled by means of the central lifting element and the second lifting element is lowered until the membrane forming the sack envelops the body and is pressed against the body's surface by the static pressure of the fluid. When the surface enveloped by the membrane is large enough and the pressure of the fluid is strong enough to clamp the body fast in the cavity formed by the sack where it is pushed in, the central lifting element is pulled up and the clamped-in body is lifted from its supporting surface. After the body has been lifted clear of its supporting surface it may get additional support on the undersurface from the enveloping parts of the sack, which reach as far as below the body and which have been driven together by the pressure of the fluid.

If the solid body is clamped sufficiently fast for it to be held during further displacement, the second lifting element can also be pulled up with a velocity corresponding to that of the central lifting element.

If more than one solid body is to be handled, it is possible to position the handling device, after it has lifted a first body in the above-described way, over a following solid body, to lower the second lifting element and to repeat the operation. Thus bodies may be lifted one after the other, until the relative descent of the second lifting element has so far progressed that there is no membrane surface available sufficient to envelop the next body.

It is further necessary for the fluid to exert a static pressure on the body which was the last to be lifted, which pressure secures a clamping hold on the body sufficient to lift its weight.

In order to release the bodies handled at the appointed place, the central lifting element could be lowered or the second lifting element could be pulled up. In both cases the bodies handled were gradually released from the membrane. The release may also be effected by removing the static pressure of the fluid, by draining it from the sack.

It is a matter of course that the membrane will have to meet certain determined requirements. The membrane must be impermeable to the fluid. It must be strong and supple, because it must be able to transmit the weights both of the fluid and of the bodies handled on to the lifting elements, and at the same time to adjust itself to the shape of the body. The membrane may be made of synthetic material or of metal foil, but a woven or knitted fabric may also serve the purpose. The membrane may be fortified with a reinforcement consisting of wires or threads, either separate or intertwined to form a network. The reinforcement may be apart from the membrane, but in that case it should be provided on that side of the membrane which is turned towards the body to be handled.

All liquids may be used for the fluid, but especially those having a high specific weight. Solids capable of behaving like liquids, such as sand, glass pearls, iron grains and the like may also be used. Even heavy gases or gases under pressure may be used under determined conditions. All media capable of adjusting themselves to any shape without very much internal friction are in this connection considered as fluids. For the rest, it is neither the specific weight nor the amount which is decisive but rather the static pressure, which a fluid is capable of exerting on the membrane and through this on a solid body.

The central lifting element is preferably constructed as a wire which carries the middle part of the membrane, while the outer edge, or rim of the membrane is carried by a tubular second lifting element. The fluid is carried in the sack formed by the membrane and, if desired, in the tubular element, the latter being filled to such a level that a satisfactory static pressure on the membrane may be obtained.

The tubular second lifting element can be closed off at the top by a cover. In that case the central lifting element is conducted through the said cover which is provided with a seal. The static pressure in the sack may then be controlled at will by means of a control cock in the cover.

It is possible to construct the central lifting element as a tube, which may be either supple or not, and to fix the lower rim of this tube to the membrane. In this case the cavity of this tube may be in open connection with the cavity which is formed by the pushing in of the membrane when a solid body is being handled.

It is also possible to use a tube-shaped central lifting element, the cavity of which has been brought into open communication with the fluid in the sack by means of one or more apertures provided in the said element. The static pressure is then supplied by the height of the fluid column in the tubular central lifting element.

In addition to this, a solid body which is to be handled must indeed have a point of application for the device. It must be solid to such a degree as to be able to withstand the static pressure of the fluid on the membrane enveloping the body and therefore it must preferably be exempt from deformation. Further, it must be possible for the body and the membrane to get into a relation, which is either founded on the shape of the body, for instance owing to the fact that a diameter situated nearer the bearing surface of the body is smaller than a diameter which is situated higher up, or that, when pulling up, there arises a friction between the body and the membrane, a vertical component of which exceeds the weight of the body, so that the body is held by the adhesion. Generally speaking, the surfaces of the body which come into contact with the membrane should be non-releasing or at most parallel to the direction of the gravitational force, unless it is possible to bring the pushed-in membrane as far as under the largest diameter of the body with the aid of the fluid.

The device may be applied for the handling of solid bodies in all kinds of media, provided the static pressure of the fluid is higher than that of the medium at the same height.

The device may for instance be used for handling all sorts of bodies which are situated under the level of some liquid, in which case a liquid having a higher static pressure or having a higher specific weight is applied as a fluid.

A device containing a heavy boring slurry as fluid may be used for handling bodies situated under water level. With the device according to this invention it is also possible to handle bodies consisting of separate particles, which have, however, acquired a certain coherence through determined internal or external causes.

For the rest, it clear that neither the central lifting element nor the second lifting element need to be of simple construction. Both may consist of a plurality of separate elements, in which case, however, the group of the central lifting elements ought to lie inside that of the second lifting elements, in order that the membrane may be suspended as a sack between the two groups.

The invention is further described hereinafter with reference to a drawing which schematically represents an embodiment of the invention.

Figure 1:
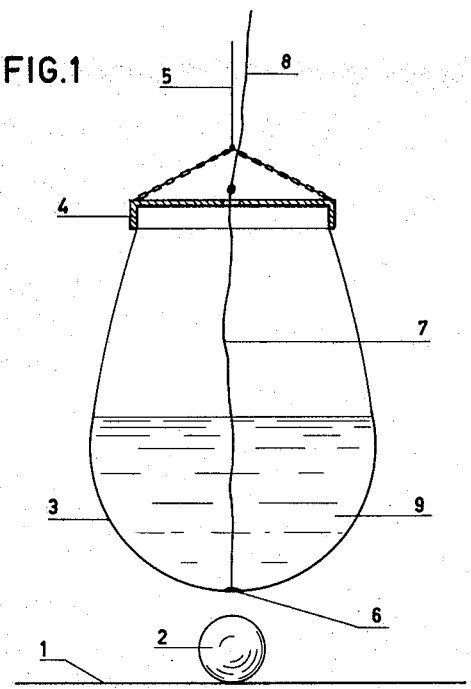
FIG. 1 shows a lateral cross-section of a device suspended over a body to be handled.
Figure 2:
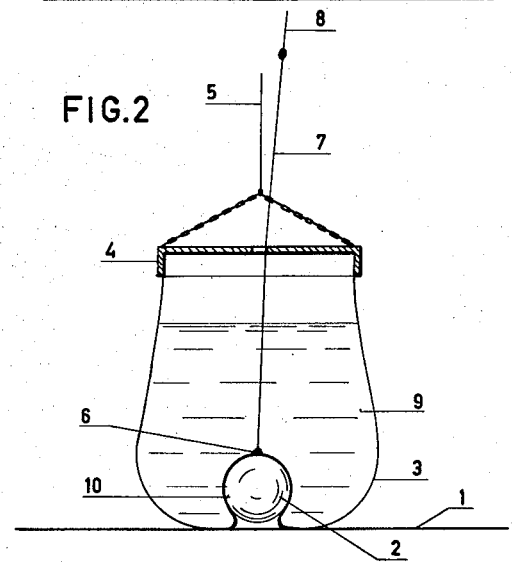
FIG. 2 shows a lateral cross-section of a device enveloping the body to be handled.

On a surface 1 there is situated a spherical body 2.

Over the body 2 a sack-like membrane 3 is suspended from an annular element 4 fastened to its rim, which is in its turn suspended from a closing wire 5.

The centre point 6 of the membrane 3 is connected with a central lifting element 7 in the form of a wire, which above the ring 4 becomes a lifting wire 8.

In the sack formed by the membrane 3 there is provided a fluid 9 having a high specific weight, which, however, need not exceed the specific weight of the body 2. In this case water may be sufficiently heavy, provided the amount is large enough for exerting an adequate static pressure at the centre 6.

To pick up a body, only the closing wire 5 is paid out, which causes the membrane 3, under the influence of the fluid 9, to wrap itself round the body 2 and to envelop it as far as possible. This causes the sack to be pushed in and a cavity 10 to be formed, in which the body is clamped fast under the pressure of the fluid. This cavity 10 remains in communications with the external surroundings, so that no vacuum need arise between the membrane and the body. When the membrane 3 has enveloped the body so as to touch the supporting surface 1 and thus comes to be supported by the surface itself, the paying out of the closing wire 5 may be stopped.

In order to lift the body 2, the lifting wire 8 is pulled up and the body, which is being held fast in the cavity 10, is carried upwards. By the pressure of the fluid on the membrane portion which is situated lower than the body 2, this cavity is strongly narrowed and the body is practically entirely enveloped by the membrane. After this there is no longer any reason for the closing wire 5 to remain lowered and it is pulled up with the same velocity as the lifting wire 8.

I claim:
1. A device for handling and lifting solid bodies, and provided with elements exerting lateral forces on such bodies, said device comprising, in combination:
   means forming a membranous sack having a rim;
   first means for lifting the sack by said rim; and second means fastened to said sack at a point substantially centrally opposite said rim for lifting said point relative to the rim so that the outer surface of said sack can form a cavity.
2. A device as defined in claim 1, including a fluid filling said sack for exerting a force on said cavity to pick up and hold an object in said cavity.
3. A device as defined in claim 2 wherein said second lifting means extends upwardly through said rim, so that relative movement between said two lifting means controls formation of said cavity, and joint upward movement of both of said lifting means raises sack along with any body within said cavity.
4. A method of handling and lifting solid bodies with a fluid-filled membranous sack, said method comprising the steps of:
   placing such fluid-filled sack immediately above a body to be lifted:
   lowering the rim of said sack so that the sack envelopes the body to be lifted; and
   raising the sack from a point substantially centrally opposite said rim to lift the body by means of the static pressure of the fluid within the sack, which causes the sack to form a cavity about the body to be lifted.
5. A method as defined in claim 4, including the subsequent step of lifting the rim of the sack and said point opposite the rim at substantially equal rates, so that the sack and the body within it are raised.
6. A method of handling a body with a fluid-filled membranous sack, said method comprising: forming a cavity with that portion of the exterior of a rimmed fluid-filled membranous sack which is substantially opposite the rim for holding a body; and subsequently raising the rim of the fluid-filled sack relative to a point on the sack substantially centrally opposite the rim, so that the cavity holding the body is destroyed and the body is released.

References Cited by the Examiner

UNITED STATES PATENTS

| | | | |
|---|---|---|---|
| 2,038,993 | 4/1936 | Erlanger | 294—77 X |
| 2,440,712 | 5/1948 | Bickell | 294—77 |

GERALD M. FORLENZA, *Primary Examiner.*

G. F. ABRAMSON, *Assistant Examiner.*